(12) United States Patent
Pelster et al.

(10) Patent No.: US 12,675,238 B2
(45) Date of Patent: Jul. 7, 2026

(54) SYSTEMS, METHODS, AND MEDIA FOR IDENTIFYING SEQUENTIAL WORKLOADS

(71) Applicant: SK hynix NAND Product Solutions Corp., Rancho Cordova, CA (US)

(72) Inventors: David J. Pelster, Longmont, CO (US); Mohammed Muqsith, Roseville, CA (US); Mark Anthony Golez, Folsom, CA (US); Teena Sebastian, Newark, CA (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 10 days.

(21) Appl. No.: 18/778,592

(22) Filed: Jul. 19, 2024

(65) Prior Publication Data

US 2026/0023502 A1 Jan. 22, 2026

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
See application file for complete search history.

(56) References Cited

U.S. PATENT DOCUMENTS

| | | | | |
|---|---|---|---|---|
| 10,656,840 | B2 * | 5/2020 | Kotte .................... | G06F 3/0635 |
| 11,455,107 | B2 * | 9/2022 | Rajgopal ................. | G06F 3/061 |
| 2015/0074337 | A1 * | 3/2015 | Jo .......................... | G06F 3/0679 |
| | | | | 711/103 |
| 2018/0314421 | A1 * | 11/2018 | Linkovsky ............ | G06F 3/0679 |
| 2024/0220116 | A1 * | 7/2024 | Doni Gurudath ....... | G06F 3/061 |

* cited by examiner

*Primary Examiner* — Jared I Rutz
(74) *Attorney, Agent, or Firm* — Byrne Poh LLP

(57) ABSTRACT

Mechanisms for identifying sequential workloads in a solid-state drive (SSD) include: receiving a plurality of read commands; and for each of the plurality of read commands: determining that the read command corresponds to a stream of one or more read commands; in response to determining that the read command corresponds to the stream of one or more read commands, incrementing a count of read commands that correspond to the stream; determining that the count meets a threshold count; in response to determining that the count meets the threshold count, determining that the count has met the threshold count for a threshold period of time; and in response to determining that the count has met the threshold count for the threshold period of time, determining that the stream is a sequential workload and taking an action on the stream based on it being determined to be a sequential workload.

18 Claims, 4 Drawing Sheets

200

200

SYSTEMS, METHODS, AND MEDIA FOR IDENTIFYING SEQUENTIAL WORKLOADS

BACKGROUND

An important aspect of solid-state drive (SSD) firmware design is the support for runtime detection of workload types, including sequential or random workloads. Typically, a host issues input/output (I/O) requests to an SSD in units of logical block address (LBA) that represents a block of data stored in the SSD. For multi-core firmware running sequential workloads, even if the host streams LBAs serially to a submission queue, the host requests can get dequeued or processed out of order by parallel threads with varying latencies running across multi-cores. This creates a partially ordered stream of LBAs for the process determining whether the workload is sequential. In this context, the thread processing the partially ordered LBA stream has to correctly determine that the system as a whole is running a sequential workload. In other words, the firmware must be able to correctly determine if a host workload is sequential even if it is internally observing a partially ordered pseudo random data stream.

Accordingly, new mechanisms for identifying sequential workloads are desirable.

SUMMARY OF THE INVENTION

In accordance with some embodiments, mechanisms, including systems, methods and media for identifying sequential workloads are provided.

In some embodiments, systems for identifying sequential workloads in a solid-state drive (SSD) are provided, the systems comprising: memory; and at least one hardware processor that is coupled to the memory and that is collectively configured to at least: receive a plurality of read commands; and for each of the plurality of read commands: determine that the read command corresponds to a stream of one or more read commands; in response to determining that the read command corresponds to the stream of one or more read commands, increment a count of read commands that correspond to the stream; determine that the count meets a threshold count; in response to determining that the count meets the threshold count, determine that the count has met the threshold count for a threshold period of time; and in response to determining that the count has met the threshold count for the threshold period of time, determine that the stream is a sequential workload and take an action on the stream based on it being determined to be a sequential workload. In some of these embodiments, the read command is determined to correspond to the stream based on a logical block address (LBA) of the read command. In some of these embodiments, the read command is determined to correspond to the stream based on a logical block address (LBA) of the read command being within a range from an LBA of a last read command of the stream. In some of these embodiments, the range is based on a maximum queue depth of a command queue of the SSD and a maximum block size of the SSD. In some of these embodiments, the range is two times the maximum queue depth times the maximum block size. In some of these embodiments, the action is to pre-fetch data for a logical block address (LBA) corresponding to the sequential workload prior to receiving a host read command for the LBA.

In some embodiments, methods for identifying sequential workloads in a solid-state drive (SSD) are provided, the methods comprising: receiving a plurality of read commands; and for each of the plurality of read commands, using at least one hardware processor to: determine that the read command corresponds to a stream of one or more read commands; in response to determining that the read command corresponds to the stream of one or more read commands, increment a count of read commands that correspond to the stream; determine that the count meets a threshold count; in response to determining that the count meets the threshold count, determine that the count has met the threshold count for a threshold period of time; and in response to determining that the count has met the threshold count for the threshold period of time, determine that the stream is a sequential workload and take an action on the stream based on it being determined to be a sequential workload. In some of these embodiments, the read command is determined to correspond to the stream based on a logical block address (LBA) of the read command. In some of these embodiments, the read command is determined to correspond to the stream based on a logical block address (LBA) of the read command being within a range from an LBA of a last read command of the stream. In some of these embodiments, the range is based on a maximum queue depth of a command queue of the SSD and a maximum block size of the SSD. In some of these embodiments, the range is two times the maximum queue depth times the maximum block size. In some of these embodiments, the action is to pre-fetch data for a logical block address (LBA) corresponding to the sequential workload prior to receiving a host read command for the LBA.

In some embodiments, non-transitory computer-readable media containing computer executable instructions that, when executed by a processor, cause the processor to perform a method for identifying sequential workloads in a solid-state drive (SSD) are provided, the method comprising: receiving a plurality of read commands; and for each of the plurality of read commands: determining that the read command corresponds to a stream of one or more read commands; in response to determining that the read command corresponds to the stream of one or more read commands, incrementing a count of read commands that correspond to the stream; determining that the count meets a threshold count; in response to determining that the count meets the threshold count, determining that the count has met the threshold count for a threshold period of time; and in response to determining that the count has met the threshold count for the threshold period of time, determining that the stream is a sequential workload and taking an action on the stream based on it being determined to be a sequential workload. In some of these embodiments, the read command is determined to correspond to the stream based on a logical block address (LBA) of the read command. In some of these embodiments, the read command is determined to correspond to the stream based on a logical block address (LBA) of the read command being within a range from an LBA of a last read command of the stream. In some of these embodiments, the range is based on a maximum queue depth of a command queue of the SSD and a maximum block size of the SSD. In some of these embodiments, the range is two times the maximum queue depth times the maximum block size. In some of these embodiments, the action is to pre-fetch data for a logical block address (LBA) corresponding to the sequential workload prior to receiving a host read command for the LBA.

DETAILED DESCRIPTION

In accordance with some embodiments, mechanisms, including systems, methods and media for identifying sequential workloads are provided.

In some embodiments, mechanisms described herein can identify sequential workloads by comparing logical block addresses (LBAs) of received read commands against one or more streams of read commands to determine if the LBAs correspond (or "are hits") on one or more of the stream(s). A state machine associated with each stream counts hits on and off the stream and a time duration that the stream maintains a hit count above a hit count threshold. Upon the hit count exceeding the hit count threshold for a threshold period of time, a sequential workload is identified as being present in the stream and suitable action can then be taken on the stream based on the identification of the stream being a sequential workload. This approach to identifying sequential workloads is advantageous in that it can detect sequential workloads in which read commands have been unordered by multi-core firmware.

Figure 1:
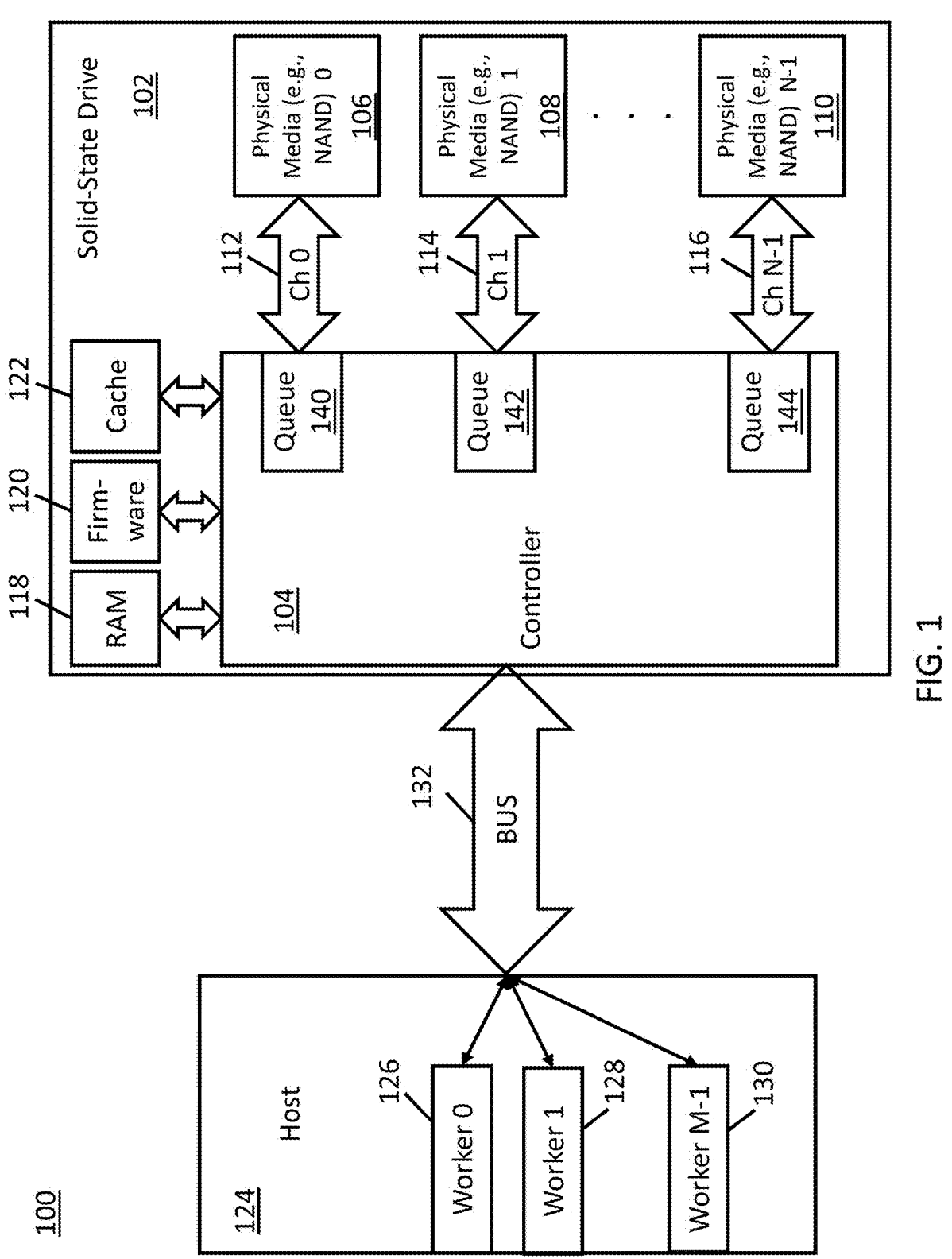
FIG. 1 is a block diagram of example hardware that can be used for identifying sequential workloads in some embodiments.

Turning to FIG. 1, an example block diagram of a system 100 including a solid-state drive 102 coupled to a host device 124 via a bus 132 in accordance with some embodiments is illustrated.

As shown, solid-state drive 102 can include a controller 104, physical media (e.g., NAND devices) 106, 108, and 110, channels 112, 114, and 116, random access memory (RAM) 118, firmware 120, and cache 122 in some embodiments. In some embodiments, more or fewer components than shown in FIG. 1 can be included. In some embodiments, two or more components shown in FIG. 1 can be included in one component.

Controller 104 can be any suitable controller for a solid-state drive in some embodiments. In some embodiments, controller 104 can include any suitable hardware processor(s) (such as a microprocessor, a digital signal processor, a microcontroller, a programmable gate array, etc.). In some embodiments, controller 104 can also include any suitable memory (such as RAM, firmware, cache, buffers, latches, etc.), interface controller(s), interface logic, drivers, etc. In some embodiments, controller 104 can be coupled to, or include (as shown), channel queues 140, 142, and 144 for transmitting commands (which can include command data) over channels 140, 142, and 144 to physical media 106, 108, and 110, respectively.

Physical media 106, 108, and 110 can be any suitable physical media for storing information (which can include data, programs, and/or any other suitable information that can be stored in a solid-state drive) in some embodiments. For example, the physical media can be NAND devices in some embodiments.

The physical media can include any suitable memory cells, hardware processor(s) (such as a microprocessor, a digital signal processor, a microcontroller, a programmable gate array, etc.), interface controller(s), interface logic, drivers, etc. in some embodiments. While three physical media (106, 108, and 110) are shown in FIG. 1, any suitable number D of physical media (including only one) can be used in some embodiments. Any suitable type of physical media (such as single-level cell (SLC) NAND devices, multilevel cell (MLC) NAND devices, triple-level cell (TLC) NAND devices, quad-level cell (QLC) NAND devices, penta-level cell (PLC) NAND, NAND with suitable levels of cells, 2D NAND devices, 3D NAND devices, NOR flash memory, any other suitable flash technology, phase change memory technology, and/or other any other suitable volatile and/or non-volatile memory storage technology) can be used in some embodiments. Each physical media can have any suitable size in some embodiments. While physical media 106, 108, and 110 can be implemented using NAND devices, the devices can additionally or alternatively use any other suitable storage technology or technologies, such as NOR flash memory or any other suitable flash technology, phase change memory technology, and/or other any other suitable non-volatile memory storage technology.

Channels 112, 114, and 116 can be any suitable mechanism for communicating information between controller 104 and physical media 106, 108, and 110 in some embodiments. For example, the channels can be implemented using conductors (lands) on a circuit board in some embodiments. While three channels (112, 114, and 116) are shown in FIG. 1, any suitable number C of channels can be used in some embodiments.

Random access memory (RAM) 118 can include any suitable type of RAM, such as dynamic RAM, static RAM, etc., in some embodiments. Any suitable number of RAM 118 can be included, and each RAM 118 can have any suitable size, in some embodiments.

Firmware 120 can include any suitable combination of software and hardware in some embodiments. For example, firmware 120 can include software programmed in any suitable programmable read only memory (PROM) in some embodiments. Any suitable number of firmware 120, each having any suitable size, can be used in some embodiments.

Cache 122 can be any suitable device for temporarily storing information (which can include data and programs in some embodiments), in some embodiments. Cache 122 can be implemented using any suitable type of device, such as RAM (e.g., static RAM, dynamic RAM, etc.) in some embodiments. Any suitable number of cache 122, each having any suitable size, can be used in some embodiments.

Host device 124 can be any suitable device that accesses stored information in some embodiments. For example, in some embodiment, host device 124 can be a general-purpose computer, a special-purpose computer, a desktop computer, a laptop computer, a tablet computer, a server, a database, a router, a gateway, a switch, a mobile phone, a communication device, an entertainment system (e.g., an automobile entertainment system, a television, a set-top box, a music player, etc.), a navigation system, etc. While only one host device 124 is shown in FIG. 1, any suitable number of host devices can be included in some embodiments.

In some embodiments, host device 124 can include workers 126, 128, and 130. While three workers (126, 128, and 130) are shown in FIG. 1, any suitable number of workers W can be included in some embodiments. In some embodiments, at least two workers can be included. A worker can be any suitable hardware and/or software that reads and/or writes data from and/or to solid-state drive 102.

Bus 132 can be any suitable bus for communicating information (which can include data and/or programs in some embodiments), in some embodiments. For example, in some embodiments, bus 132 can be a PCIE bus, a SATA bus, or any other suitable bus.

Figure 2:
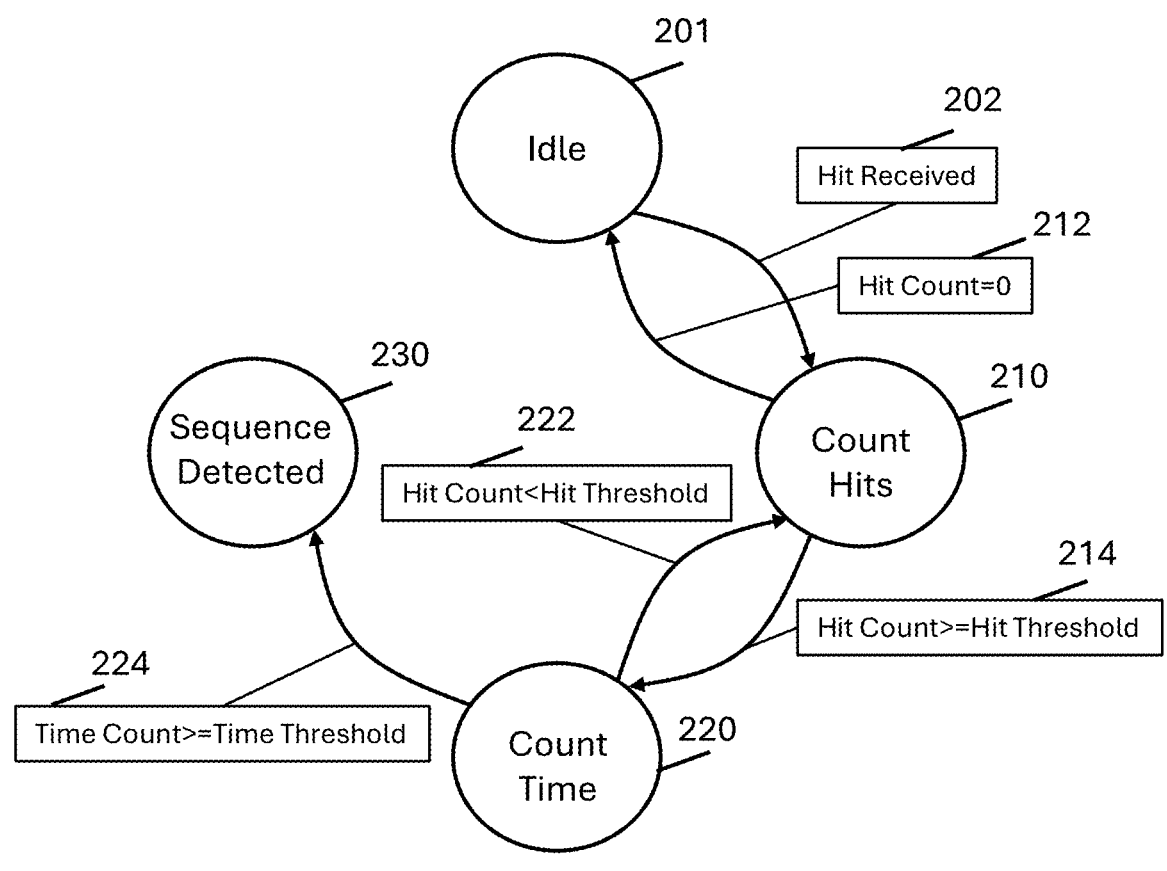
FIG. 2 is an example diagram of a state machine for identifying sequential workloads in some embodiments.

Turning to FIG. 2, an example 200 of a state machine that can be used to identify sequential workloads in accordance with some embodiment is shown. An instance of this state machine can be implemented for each stream of read commands that is being monitored, in some embodiments. As illustrated, in some embodiments, state machine 200 can include four states: idle state 201; count hits state 210; count time state 220; and sequence detected state 230.

In some embodiments, state machine 200 begins in idle state 201. When a read command that corresponds to a stream of the state machine (i.e., the read command is "a hit" on the stream) is received at 202, the state machine moves to count hits state 210 and a hit count for the state machine is incremented to one from a value of zero, in some embodiments. In some embodiments, a read command can be considered as being a hit on a stream when a logical block address (LBA) of the read command is within a range LAST_LBA+/−SEQ_HIT_DISTANCE, where LAST_LBA is the last received LBA for the selected stream and SEQ_HIT_DISTANCE is two times the maximum queue depth of the command queue times the maximum block size of the solid-state drive (SSD).

While in state 210, each read command that is received and that is a hit on the stream increases the hit count for the stream, and each read command that is received and that is not a hit on the stream decreases the hit count for the stream. If it is determined at 212 that the hit count has reached zero, then the statement machine move to idle state 201. If it is determined at 214 that the hit count is greater than (or equal to) a hit threshold, then state machine 200 moves to the count time state 220. Any suitable hit count threshold can be used in some embodiments.

While in state 220, the state machine counts the time in this state in addition to counting hits as described in connection with state 210. If it is determined at 222 that the hit count is no longer greater than (or equal to) the hit threshold, then state machine 200 moves to count hits state 210. If it is determined at 224 that the time count is greater than (or equal to) a time threshold, then the statement machines moves to sequence detected state 230 and a sequential workload is considered identified.

Figure 3:
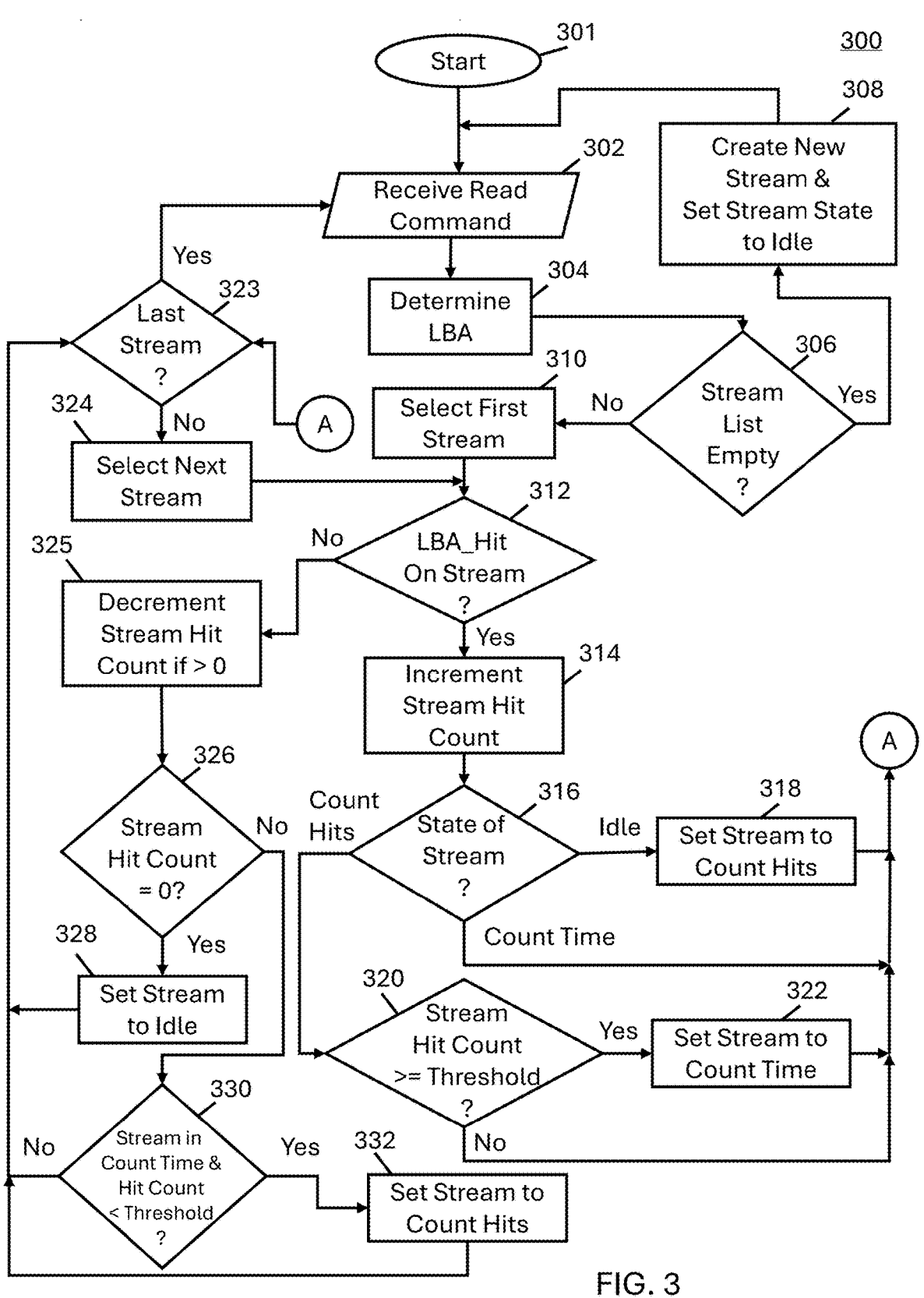
FIG. 3 is a flow diagram of an example process for monitoring read commands in order to identify sequential workloads in some embodiments.

Turning to FIG. 3, an example 300 of process for monitoring read commands in order to identify sequential workloads in accordance with some embodiments is shown. Process 300 can be executed by the controller of the SSD (e.g., controller 104 of FIG. 1), by a host (e.g., host 124 of FIG. 1), and/or by any other suitable device.

As illustrated, after process 300 begins at 301, the process receives a read command at 302. Any suitable read command can be received and it can be received in any suitable manner, in some embodiments.

Next, at 304, process 300 can determine the logical block address (LBA) of the received read command. This determination can be made in any suitable manner in some embodiments. For example, in some embodiments, this determination can be made by inspecting an LBA field of the command in some embodiments.

Then, at 306, process 300 can determine if a list of streams being monitored is empty. This determination can be made in any suitable manner, in some embodiments. If it is determined at 306 that the list of streams being monitored is empty, then at 308, process 300 can create a new stream and set the stream's state to idle, and then loop back to 302 to wait for and/or receive the next read command. Creating a new stream and setting the stream's state to idle can be performed in any suitable manner, in some embodiments. Otherwise, if it is determined at 306 that the list of streams being monitored is not empty, then at 310, process 300 can select the first stream in the list. Any suitable stream can be selected as the first stream and the first stream can be selected in any suitable manner, in some embodiments.

Next, process 300 can determine if the LBA determined at 304 is a hit on the selected stream. The determination of whether an LBA is a hit on the selected stream can be performed in any suitable matter in some embodiments. For example, if the LBA is within a range LAST_LBA+/−SEQ_HIT_DISTANCE, where LAST_LBA is the last received LBA for the selected stream and SEQ_HIT_DIS-TANCE is equal to two times the maximum queue depth of the command queue times the maximum block size of the SSD, the read command can be considered to be a hit on the selected stream, in some embodiments.

If it is determined at 312 that the LBA determined at 304 is a hit on the selected stream, then process 300 can increment the stream hit count at 314. The stream hit count can be incremented at 314 in any suitable manner, in some embodiments.

Then, at 316 process 300 can determine the state of the stream. If it is determined at 316 that the stream is in the idle state, process 300 can set the stream to the count hits state at 318 and then branch to 323.

If it is determined that the stream is in the count hits state, then at 320 process can determine if the stream hit count is greater than (or equal to) a hit count threshold. If so, process 300 can set the stream to the count time state at 322 and then branch to 323. If it is determined at 320 that the stream hit count is not greater than (or equal to) the hit count threshold, then process 300 can branch to 323.

If it is determined at 316 that the stream is in the count time state, then process 300 can branch to 323.

At 323, process 300 can determine if the currently selected stream is the last stream in the list of streams to be monitored. If not, then, at 324, process can select the next stream in any suitable manner and loop back to 312. Otherwise, process 300 can branch to 302 to wait for and/or receive the next read command.

If it is determined at 312 that the LBA determined at 304 is not a hit on the selected stream, then process 300 can branch to 325 at which it can decrement the stream hit count if it is greater than zero. The stream hit count can be decremented in any suitable manner in some embodiments.

Next, at 326, process 300 can determine if the stream hit count is equal to zero. If so, process 300 can set the stream to the idle state at 328 and then branch to 323 and proceed as described above. Otherwise, process 300 can branch to 330 at which is can determine if the stream is in the count time state and the hit count is not greater than (or equal to) the hit count threshold. If so, then process 300 can set the stream to the count hits state at 332 and then branch to 323 and proceed as described above. Otherwise process 300 can then branch to 323 and proceed as described above.

Figure 4:
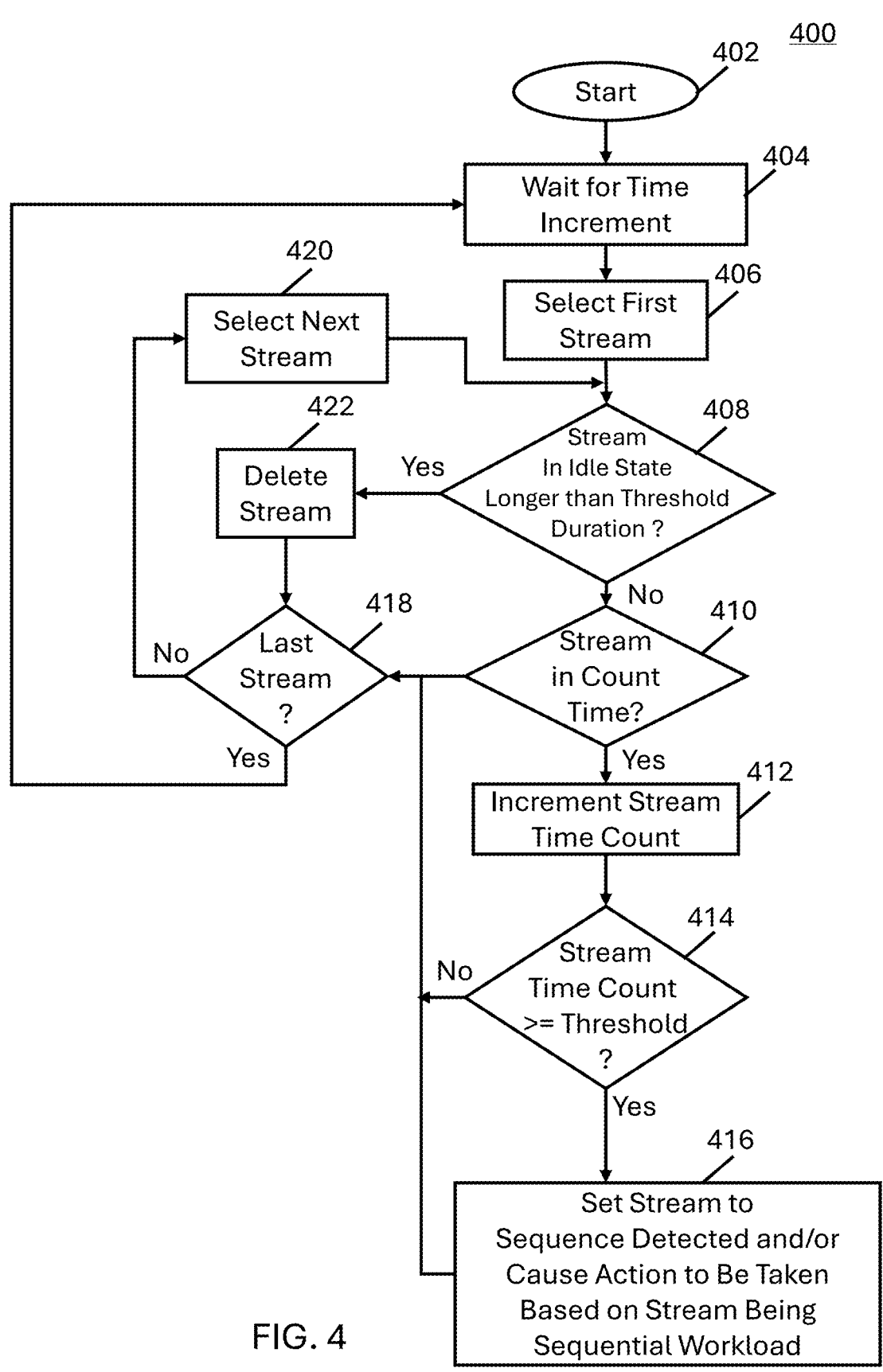
FIG. 4 is a flow diagram of an example process for monitoring time in order to identify sequential workloads in some embodiments.

Turning to FIG. 4, an example 400 of a process for monitoring time in order to identify sequential workloads in accordance with some embodiments is shown. Process 400 can be executed by the controller of the SSD (e.g., controller 104 of FIG. 1), by a host (e.g., host 124 of FIG. 1), and/or by any other suitable device. Process 400 can run concurrently with process 300 in some embodiments.

As illustrated, after process 400 begins at 402, the process can wait for a time increment at 404. Any suitable increment can be used in some embodiments. For example, in some embodiments, process 400 can wait for one second to have passed since the last time it completed 404.

Then, at 406, process 400 can select the first stream in the list of streams being monitored. Any suitable stream can be selected as the first stream and the selection can be performed in any suitable manner, in some embodiments.

Next, at 408, process 400 can determine if the selected stream has been in the idle state for longer than a threshold duration. Any suitable threshold duration can be used and this determination can be made in any suitable manner. If the selected stream has been in the idle state for longer than the threshold duration, then process 400 can delete the selected stream at 422 and branch to 418.

Otherwise, if the selected stream has not been in the idle state for longer than the threshold duration, then process 400 can determine at 410 if the stream is in the count time state. If not, then process 400 can branch to 418. Otherwise, process 400 can increment the stream's time count at 412. The stream's time count can be incremented in any suitable manner in some embodiments.

Next, at 414, process 400 can determine if the stream time count is greater than (or equal to) a time count threshold. If so, then process 400 can set the stream to the sequence detected state and/or cause an action to be taken based on the stream being a sequential workload and then branch to 416. Any suitable action can be taken based on the stream being identified as a sequential workload, in some embodiments. For example, in some embodiments, the SSD can "pre-fetch reads" in which it issues internal read requests for certain LBAs in the sequence to the NAND device in anticipation of the host requesting those LBAs, and prepopulates data in one or more prefetch buffers. Once the host actually requests the LBAs—the SSD then services them from the prefetch buffer(s). This can improve system input/output performance (latency and throughput) in sequential read workloads. Otherwise, process 400 can branch to 418.

At 418, process 400 can determine if the selected stream is the last stream in the list of streams to be monitored. This determination can be made in any suitable manner in some embodiments. If not, process 400 can branch to 420 at which the next stream in the list of streams to be monitored can be selected in any suitable manner. Otherwise, process 400 can loop back to 404 and proceed as described above.

In some embodiments, at least some of the above-described blocks of the processes of FIGS. 3 and 4 can be executed or performed in any order or sequence not limited to the order and sequence shown in and described in connection with the figures. Also, some of the above blocks of the processes of FIGS. 3 and 4 can be executed or performed substantially simultaneously where appropriate or in parallel to reduce latency and processing times in some embodiments. Additionally or alternatively, some of the above described blocks of the processes of FIGS. 3 and 4 can be omitted in some embodiments.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

As can be seen from the description above, new mechanisms (which can include systems, methods, and media) for identifying sequential workloads are provided. In some embodiments, these mechanisms for identifying sequential workloads are advantageous in that they can detect sequential workloads in which read commands have been unordered by multi-core processors.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for identifying sequential workloads in a solid-state drive (SSD), comprising:
   memory; and
   at least one hardware processor that is coupled to the memory and that is collectively configured to at least:
   receive a plurality of read commands; and
   for each of the plurality of read commands:
   determine that the read command corresponds to a stream of one or more read commands;
   in response to determining that the read command corresponds to the stream of one or more read commands, increment a count of read commands that correspond to the stream;
   determine that the count meets a threshold count by determining that the count is equal to the threshold count or by determining that the count is greater than the threshold count;
   in response to determining that the count meets the threshold count, determine that the count has met the threshold count for a non-zero threshold period of time; and
   in response to determining that the count has met the threshold count for the non-zero threshold period of time, determine that the stream is a sequential workload and take an action on the stream based on it being determined to be the sequential workload.

2. The system of claim 1, wherein the read command is determined to correspond to the stream based on a logical block address (LBA) of the read command.

3. The system of claim 1, wherein the read command is determined to correspond to the stream based on a logical block address (LBA) of the read command being within a range from an LBA of a last read command of the stream.

4. The system of claim 3, wherein the range is based on a maximum queue depth of a command queue of the SSD and a maximum block size of the SSD.

5. The system of claim 4, wherein the range is two times the maximum queue depth times the maximum block size.

6. The system of claim 1, wherein the action is to pre-fetch data for a logical block address (LBA) corresponding to the sequential workload prior to receiving a host read command for the LBA.

7. A method for identifying sequential workloads in a solid-state drive (SSD), comprising:

receiving a plurality of read commands; and for each of the plurality of read commands, using at least one hardware processor to:

determine that the read command corresponds to a stream of one or more read commands;

in response to determining that the read command corresponds to the stream of one or more read commands, increment a count of read commands that correspond to the stream;

determine that the count meets a threshold count;

in response to determining that the count meets the threshold count by determining that the count is equal to the threshold count or by determining that the count is greater than the threshold count, determine that the count has met the threshold count for a non-zero threshold period of time; and in response to determining that the count has met the threshold count for the non-zero threshold period of time, determine that the stream is a sequential workload and take an action on the stream based on it being determined to be the sequential workload.

8. The method of claim 7, wherein the read command is determined to correspond to the stream based on a logical block address (LBA) of the read command.

9. The method of claim 7, wherein the read command is determined to correspond to the stream based on a logical block address (LBA) of the read command being within a range from an LBA of a last read command of the stream.

10. The method of claim 9, wherein the range is based on a maximum queue depth of a command queue of the SSD and a maximum block size of the SSD.

11. The method of claim 10, wherein the range is two times the maximum queue depth times the maximum block size.

12. The method of claim 7, wherein the action is to pre-fetch data for a logical block address (LBA) corresponding to the sequential workload prior to receiving a host read command for the LBA.

13. A non-transitory computer-readable medium containing computer executable instructions that, when executed by a processor, cause the processor to perform a method for identifying sequential workloads in a solid-state drive (SSD), the method comprising:

receiving a plurality of read commands; and for each of the plurality of read commands:

determining that the read command corresponds to a stream of one or more read commands;

in response to determining that the read command corresponds to the stream of one or more read commands, incrementing a count of read commands that correspond to the stream;

determining that the count meets a threshold count by determining that the count is equal to the threshold count or by determining that the count is greater than the threshold count;

in response to determining that the count meets the threshold count, determining that the count has met the threshold count for a non-zero threshold period of time; and in response to determining that the count has met the threshold count for the non-zero threshold period of time, determining that the stream is a sequential workload and taking an action on the stream based on it being determined to be the sequential workload.

14. The non-transitory computer-readable medium of claim 13, wherein the read command is determined to correspond to the stream based on a logical block address (LBA) of the read command.

15. The non-transitory computer-readable medium of claim 13, wherein the read command is determined to correspond to the stream based on a logical block address (LBA) of the read command being within a range from an LBA of a last read command of the stream.

16. The non-transitory computer-readable medium of claim 15, wherein the range is based on a maximum queue depth of a command queue of the SSD and a maximum block size of the SSD.

17. The non-transitory computer-readable medium of claim 16, wherein the range is two times the maximum queue depth times the maximum block size.

18. The non-transitory computer-readable medium of claim 13, wherein the action is to pre-fetch data for a logical block address (LBA) corresponding to the sequential workload prior to receiving a host read command for the LBA.

* * * * *